UNITED STATES PATENT OFFICE.

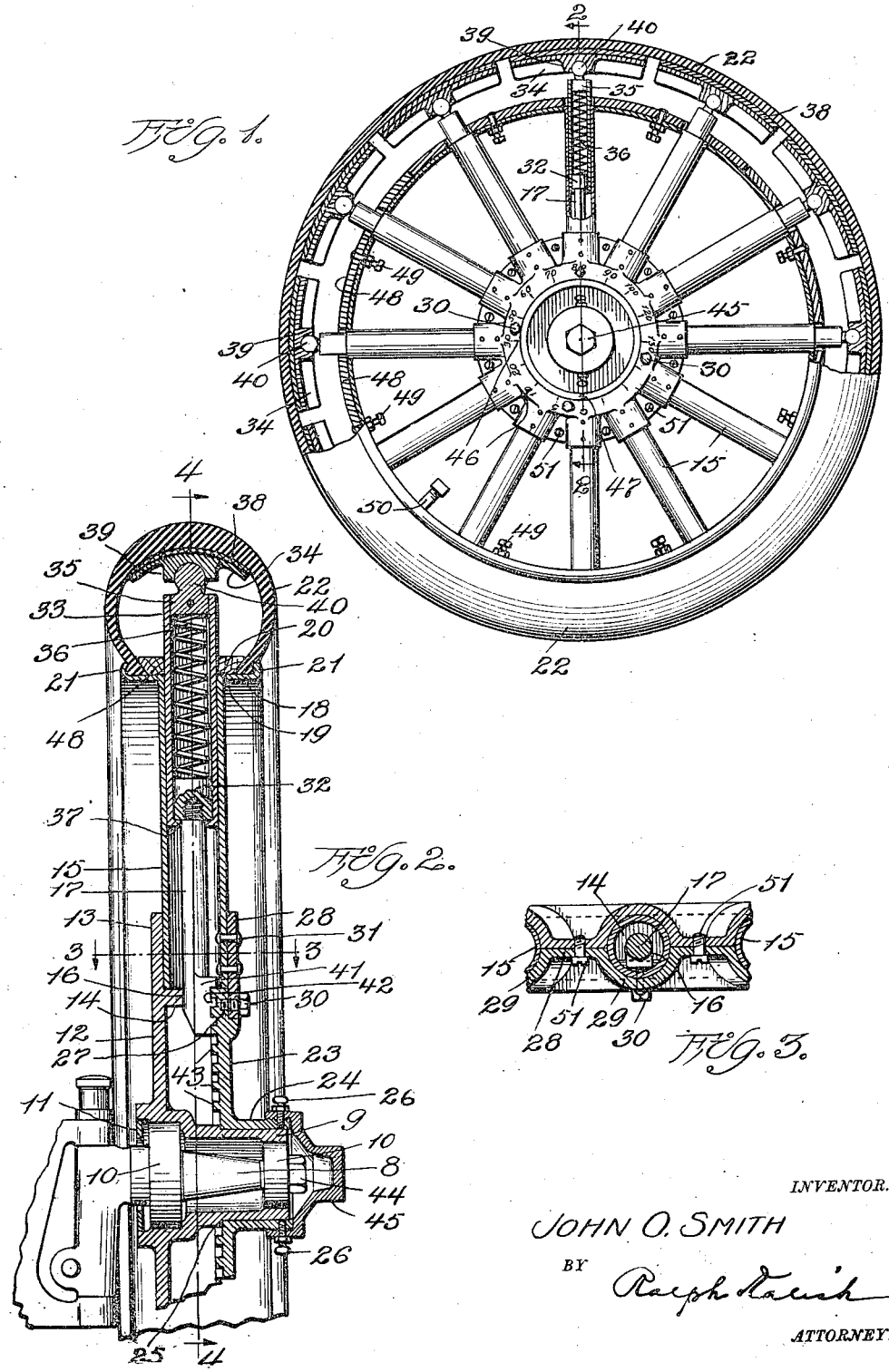

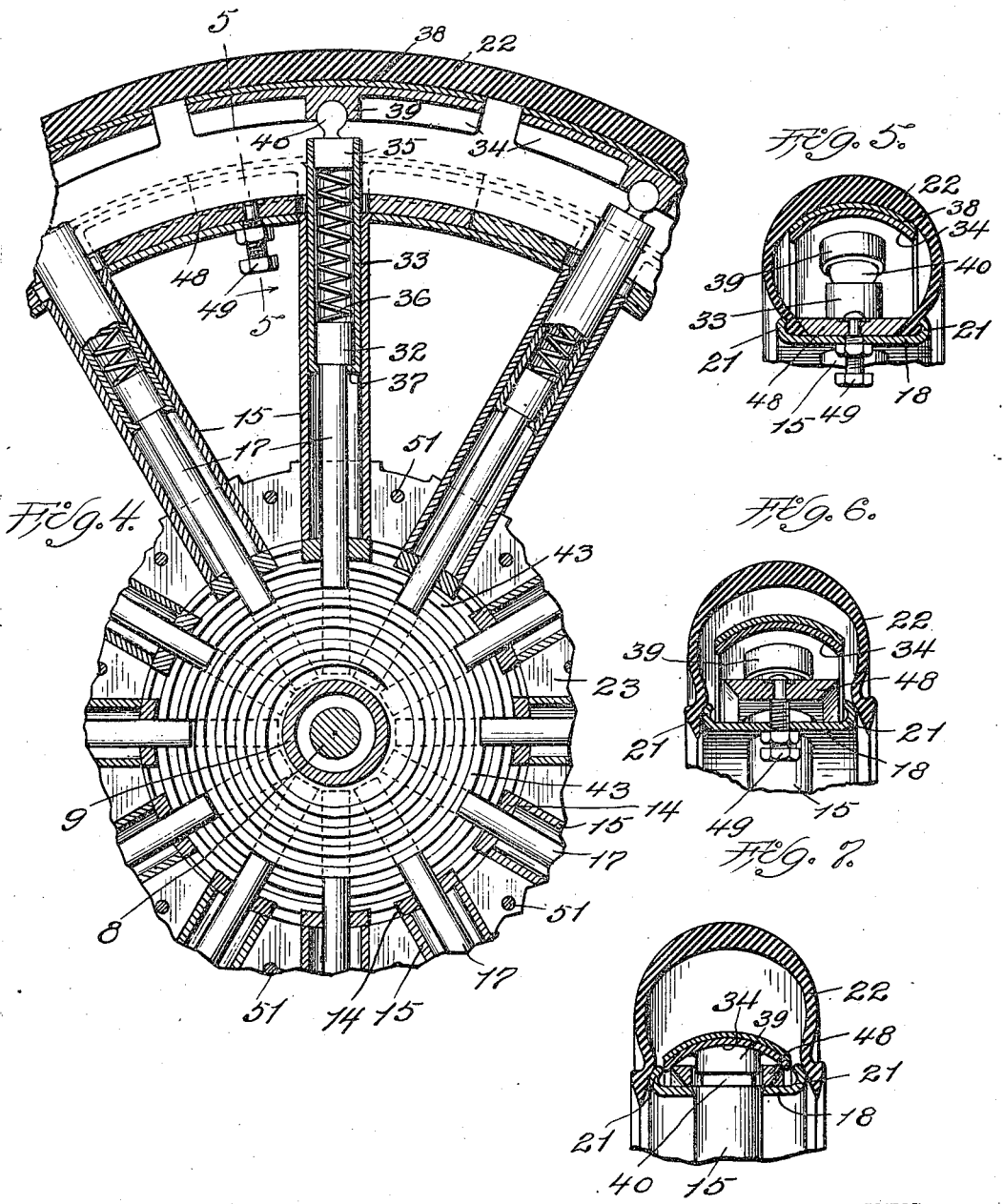

JOHN O. SMITH, OF MOBERLY, MISSOURI.

VEHICLE-WHEEL.

1,299,628.　　　　　Specification of Letters Patent.　　　Patented Apr. 8, 1919.

Application filed April 20, 1918. Serial No. 229,740.

*To all whom it may concern:*

Be it known that I, JOHN OSCAR SMITH, a citizen of the United States, residing at the city of Moberly, county of Randolph, and State of Missouri, have invented certain new and useful Improvements in Vehicle-Wheels, of which the following is a specification, reference being had to the accompanying drawings, forming a part thereof.

This invention relates generally to vehicle wheels and, more particularly, to certain new and useful improvements in vehicle wheels of the spring type, the objects of my present invention being to provide an efficient spring wheel of comparatively simple and inexpensive construction, which will have the general appearance of the ordinary or standard pneumatic wheel; to provide a wheel of the type stated having resilient means including a "clencher casing" and radially disposed "cushion-spring" spokes between the casing and hub; to provide a wheel of the type stated having easily manipulated means for varying the tension of the cushion-springs and to indicate approximately the degree of tension of the springs; to provide a wheel of the type stated having conveniently manipulated means for the attaching and detaching of the clencher casing; and to improve generally upon, and simplify the construction of, wheels of the class described.

With the above and other objects in view, my present invention resides in certain novel features of form, construction, arrangement, and combination of parts, all as will hereinafter be described and afterward pointed out in the claims.

In the accompanying drawings,

Figure 1 is an elevation, partly in section, of a wheel constructed in accordance with and embodying the preferred form of my invention;

Fig. 2 is an enlarged fragmental transverse sectional view through the wheel taken approximately on the indicated line 2—2, Fig. 1;

Fig. 3 is a detail sectional plan taken approximately on the line 3—3, Fig. 2, showing the connection between the hub and spokes;

Fig. 4 is an enlarged fragmental vertical sectional view taken approximately on the line 4—4, Fig. 2, showing the means for effecting a variable tension upon the cushion-spokes;

Fig. 5 is a transverse sectional view taken approximately on the line 5—5, Fig. 4, showing the casing as "clenched" to the rim;

Fig. 6 is a view similar to Fig. 5, showing the cushion-spoke withdrawn from engagement with the casing and the casing clenching element moved from the rim to permit the detaching of the casing, as shown; and Fig. 7 is a view similar to Figs. 5 and 6, but in the plane of the spoke, showing the spoke fully withdrawn from the casing and the casing as detached.

Referring more particularly to the said drawings, in which like reference characters refer to like parts throughout the several views, my new wheel is shown as operatively mounted upon a vehicle-axle 8 connected with the usual knuckle as in the "front" or steering wheel of an automobile, but obviously the wheel may be as readily mounted upon a fixed or rear axle and be employed as a "drive" wheel.

The hub of my wheel comprises a substantially cylindrical box 9, which is shown as being receptive of bearings, such as 10—10, and a dust-ring 11, such as a felt-washer or the like. The casings or outer members of the bearings 10 are suitably fixed to the box 9 of the wheel, so that the bearings 10 are removable with the wheel from the axle. Fixed to the box 9, preferably formed integral therewith, and adjacent its inner end, is an annular flange or spoke-disk 12, which, as best shown in Figs. 2 and 3, carries next its periphery suitably circumferentially spaced semi-cylindrical socket elements 13, whose bottoms 14 form rests or supports for the inner end of the tubes or barrels 15, and which bottoms 14 are provided or formed with approximately U-shaped openings or apertures 16 through which the stems 17 of the cushion-spokes extend and movably fit. A circular rim 18 provided with circumferentially spaced apertures 19 surrounds the free ends of the spoke-barrels 15 and is secured or fixed in place thereon preferably by upsetting the ends of the barrels, as at 20, see especially Figs. 2 and 4. Rim 18 has its lateral margins "turned" outwardly to form or provide "clench" flanges 21 arranged to operatively receive the free edges of a casing.

such as 22, which casing, for the purposes of this illustration, may be the ordinary casing of a pneumatic tire of the "clench" type.

Complementing disk 12, and also for purposes hereinafter appearing, is a second or coöperating spoke-disk 23, whose perimeter extends only to the plane of the bottoms 14 of the sockets 13, and which disk 23 is provided or formed with a foot-flange 24 mounted for rotative movement upon the box 9, disk 23 being held properly spaced axially from disk 12 by means of a shoulder or the like 25 formed upon the box 9 and one or more set-screws 26, as best shown in Fig. 2.

Next its periphery and in its outer face, the disk 23 is formed with a suitable mortise to provide a seat for a retaining-ring 28 having approximately semi-cylindrical elements or portions 29 forming companions to said socket-elements or portions 13 of the disk 12. The ring 28 is rigidly secured to the main hub disk 12 by means of screws, rivets, or the like 51, and is also riveted, as at 31, to each of the tubes or barrels 15, whereby I obtain a rigid, strong hub structure. Formed in the ring 28 at suitable circumferential intervals are threaded apertures to receive screws or the like 30 adapted to fit into suitable threaded seats 27 formed in the disk 23 to securely lock the parts together and the disk 23 against rotation.

The spoke-stems 17 are each reduced and threaded at their outer ends and have secured thereto suitable spring-abutments 32; and telescopically fitting over each abutment 32, and within each barrel 15, is a tubular spring-casing 33, which normally projects at its outer end beyond the outer end of the barrel 15 and carries at its projecting end an abutment 35 and a shoe 34 adapted to bear against the inner surface of the casing 22. Disposed between said abutments 32 and 35 and within the casing 33, is an extensile coil-spring 36. At its inner end, each casing 33 is bent or flanged inwardly to provide a stop, as at 37, adapted to engage the under or inner face of inner abutment 32 to limit the outward movement of the casing 33 and its inclosed spring 36 relatively to the barrel 15. The tire-casing, which is usually of a suitable rubber or like flexible material or fabric, is protected from injury and wear by abrasion by the shoes 34 by the interplacement of pads 38, as seen particularly in Figs. 1, 2, and 4, which pads preferably consist of sections or pieces of felt, rubber, or other suitable material.

The shoes 34 are each provided with a "socket" 39 and the outer spring-abutment 35 with a "ball" 40 operatively fitting and suitably held in the coöperating shoe-socket 39, whereby certain relative movements are permitted between the shoe and "spoke" to compensate for side strains delivered to the casing 22, the spokes proper being thereby relieved from such strains and correspondingly permitted to freely operate in straight radial lines and with comparatively little added frictional resistance between their telescoping parts. By this expedient, it will be evident that, at times when the casing is moved from its normal or true position, that is laterally over the plane of the spoke-ends, the ball-and-socket joint described will allow of such casing movement without materially affecting the straight line, radial positions of the movable elements of the spokes, flexure of the casing approximately similar to that of a pneumatic tire being thereby permitted and the resiliency of the wheel as a whole being correspondingly increased.

To effect a variation of the tension of the springs 36 of the spokes to obtain the desired "cushion effect," after the manner of varying the air pressure in pneumatic tires, the spoke-stems 17 are extended at their inner ends to form or provide heads 41 having on their outer face spiral flanges 42 which fit into, and are firmly held by the bottoms or portions 14 of the sockets 13 in operative engagement with a spiral rib 43 formed on the inner face of the outer spoke-disk 23. The wheel is secured to the axle in a manner common to ordinary wheels, as by a nut 44, and is further provided with a hub-cap 45, which is flanged over the end of the foot-flange 24 of the spoke-disk 23 and there secured by the set-screws 26, as seen particularly in Fig. 2. The hub-cap 45, as shown, is provided with a non-circular portion, to which a wrench may be operatively fitted, whereupon, after a loosening of the set-screws 26 to release the foot-flange 24 from the box 9, the hub-cap 45 may be rotatively moved, carrying with it the spoke-disk 23, whose spiral rib 43, engaging the spiral flanges 42 of the spoke-stems 17, will effect a radial movement of the spring-abutments 32 and, according to the direction of rotative movement of the hub-cap 45, either diminish or increase the tension of the spokes. This act of spring adjustment is done, of course, after having first loosened the screws 30 which lock or hold the retaining-ring 28 and spoke-disk 23 together.

In the building of my new wheel, I exercise care in making all the spoke-elements of approximately uniform dimensions and also select for each wheel a set of springs of approximately uniform "power" and, in the assembly, arrange the parts so that the springs will have an approximately zero tension when the stems 17 are all drawn to their nearest possible distance to the axle and have an approximately maximum tension when moved farthest from the axle. By so doing I am enabled to approximately predetermine the "pounds pressure" of the springs, substantially the same as is now possible with pneumatic tires, and I am further able to indicate such pressure by means of a fixed scale, such as the scale 46 on the retaining-ring 28, and an index "mark" 47 on the spoke-disk 23, as shown in Fig. 1.

Mounted over or upon the periphery of the rim 18 and apertured to slidably receive therethrough the spring-casings 33, is a series of segmental clencher-plates 48, whose side margins are suitably beveled or chamfered, and which segments are radially movable relatively to the rim. Projecting radially inwardly through the rim and having their outer ends suitably fixed in the segments or plates 48, are screws or the like 49, by means of which the segments 48 may be moved outwardly from the rim to permit the attachment or detachment of a casing and then drawn toward the rim to cause their beveled margins to seat the edges of the tire-casing in the clencher-flanges 21 of the rim.

Assuming the wheel to be assembled, the tire-casing attached, as recited, and the spring-spokes extended and bearing outwardly against the casing, as shown in all the figures, save Figs. 6 and 7, and it be desired to remove the casing, two essential steps or operations are required, the one being the moving of the clencher-plates 48 outwardly from engagement with the casing-edges by turning the screws 49 to the positions shown in Fig. 6, and the other step being the withdrawal of the shoes 34 from engagement with the casing, accomplished by a rotation of the hub-cap 45 and the spoke-disk 23, as described. The shoes 34 are first moved to the position thereof shown in Fig. 6, when the casing-edges may be conveniently moved from within the flanges 21 of the rim and to the position thereof shown. The plates or segments 48 and shoes 34 are then brought to the position thereof shown in Fig. 7, which showing, Fig. 7, is as of a complete withdrawal of the spokes, and it is in this position where the "indicator" registers "zero". With the plates 48 and shoes 34 in the position shown in Fig. 7, it is evident that the tire-casing may be detached from the wheel in a manner substantially similar as from an ordinary or standard pneumatic wheel; and it is further evident that with the shoes 34 in the position shown in Fig. 7, the shoes being suitably held to the balls 40 of the spokes, the wheel could be employed or used, if it was necessary so to do, without injury or damage to the wheel, as one of the non-resilient or rigid type. At this time also, with the shoes 34 in such inner position, any necessary repairs or adjustments having been made, the casing is replaced by fitting its edges over the wheel or into the position shown in Fig. 7. The shoes 34 and plates 48 are then moved into approximately the position shown in Fig. 6, when the casing edges may be fitted into the flanges 21, after which the plates or segments 48 are drawn and secured in inner position upon the rim to "clench" the edges of the casing in the flanges of the rim and the shoes 34 moved outwardly to any desired "scale" position for selective spring tension by again turning the spoke-disk 23, as before described. The parts are then locked in position, also as before described, when the wheel is again ready for use or employment.

My new wheel, constructed and embodying the parts described, is strong, efficient, and exceedingly resilient to take up shocks and jars to which the vehicle may be subjected, substantially in the manner of the usual or standard pneumatically tired wheel, which my new wheel resembles in outward appearance. Different from such pneumatically tired wheel, however, my new wheel is not subject to "punctures" with their consequent trouble and inconvenience.

In order to obviate the building up of air pressures within the tire-casing, due to exposure to heat or to possible "pump" actions of certain of the operative parts, I provide the rim with a suitable relief valve 50, as shown in Fig. 1.

I am aware that changes in the form, construction, arrangement, and combination of the several parts of my new wheel may be made and substituted for those herein shown and described without departing from the nature and principle of my invention.

Having thus described my invention, what I claim and desire to secure by Letters Patent is:

1. A wheel comprising a hub, a rim, rigid tubular spokes disposed between, and fixed at their ends to, the hub and rim, and tire-distending members mounted for movement in the spokes and each normally having an end projecting outwardly beyond the outer face of the rim, in combination with a tire-casing seated detachably upon the outer face of the rim and enveloping the projecting ends of said members, means including members adapted for engagement with the tire-casing and the rim for detachably securing the tire-casing to its seat upon the rim, and means for moving the tire-distending members inwardly relatively to the spokes to facilitate detachment of the tire-casing from its seat upon the rim on disengagement of said securing-members.

2. A wheel comprising a hub, a rim, and rigid tubular spokes disposed between, and fixed at their ends to, the hub and rim, in combination with a tire-casing adapted for removable mounting upon the rim, tire-casing distending members mounted for movement in the spokes, and means for moving said members inwardly or outwardly relatively to the spokes to facilitate mounting or demounting of the tire-casing.

3. In a wheel, a hub, a rim, tubular spokes disposed between and fixed at their ends to the hub and rim, a tubular tire-casing detachably mounted upon the rim, yieldable casing-supporting members movable within the spokes and each normally having an end projecting beyond the rim and within the casing, and means for drawing the yieldable members inwardly relatively to the hub to detach the tire-casing from the rim.

4. In a wheel, a hub, a rim, tubular spokes disposed between and fixed at their ends to the hub and rim, a tubular tire-casing detachably mounted upon the rim, yieldable casing-supporting members movable within the spokes and each normally having an end projecting beyond the rim and within the casing, and means for drawing the yieldable members inwardly relatively to the hub to detach the tire-casing from the rim, said means including stems disposed within the spokes and having engagement with the yieldable members, and a rotative member at the hub having engagement with the stems.

5. In a wheel, a hub, a rim, tubular spokes disposed between and fixed at their ends to the hub and rim, a tubular tire-casing detachably mounted upon the rim, yieldable casing-supporting members movable within the spokes and each normally having an end projecting beyond the rim and within the casing, and means for drawing the yieldable members inwardly relatively to the hub to detach the tire-casing from the rim, said means including ribbed stems disposed within the spokes and having engagement with the yieldable members, and a spirally ribbed rotative member at the hub having engagement at its rib with the ribs of the stems.

6. In a wheel, a hub, a rim, tubular spokes disposed between and fixed at their ends to the hub and rim, a tubular tire-casing mounted upon the rim, spring-members movable within the spokes and each normally having an end yieldingly pressing upon the inner face of the tire-casing, and means for varying the pressure of said members upon the tire-casing.

7. In a wheel, a hub, a rim, tubular spokes disposed between and fixed at their ends to the hub and rim, a tubular tire-casing mounted upon the rim, spring-members movable within the spokes and each normally having an end yieldingly pressing upon the inner face of the tire-casing, and means including a rotative member at the hub having engagement with all the spring-members for varying the pressure of said members upon the tire-casing.

8. In a wheel, a hub, a rim, tubular spokes disposed between and fixed at their ends to the hub and rim, a tubular tire-casing mounted upon the rim, spring-members movable within the spokes and each normally having an end yieldingly pressing upon the inner face of the tire-casing, each of said members including an abutment, a second abutment, a coiled spring disposed between the abutments, a spring-inclosing casing fixed to the first abutment and telescopically fitting over and adapted for engagement with the second abutment, and a ribbed stem having engagement with the second abutment, and means including a spirally ribbed rotative member at the hub having engagement at its rib with the ribs of all said stems for varying the pressure of said spring-members upon the tire-casing.

9. In a wheel, a hub, a rim, tubular spokes disposed between and fixed at their ends to the hub and rim, tire-engaging members movable within the spokes, each of said members including a stem lengthwise disposed within the spoke, and means having engagement with said stems for adjustably holding the tire-engaging-members in operative position in the spokes.

10. In a wheel, a hub, a rim, tubular spokes disposed between and fixed at their ends to the hub and rim, tire-engaging members movable within the spokes, and means for adjustably holding the tire-engaging members in operative position in the spokes.

11. In a wheel, a hub comprising a tubular portion having an annular flange provided with an annular series of approximately semi-cylindrical sockets, a retaining-ring provided with a companion series of approximately semi-cylindrical sockets, tubular spoke-members seated in the sockets provided by the ring and flange, means rigidly securing the ring and flange together with the spoke-members therebetween, a rim surrounding and fixed to the spoke-members, tire-engaging members movable within the spoke-members, and means for adjustably holding the tire-engaging members in operative position in the spoke-members, said means including ribbed stems disposed within the spoke-members and having engagement with the tire-engaging members, and a spirally ribbed disk mounted for rotation upon said tubular portion of the hub and within said ring, said disk having engagement at its rib with the ribs of said stems.

12. In a wheel, a hub, a rim, a tubular casing mounted on the rim, a series of spring-members engaging the inner face of the casing and arranged to act as cushions between the hub and casing, each of said spring-members including a coiled spring, and means including a single manipulative member for simultaneously effecting a variation in tension of all the springs.

13. In a wheel, a hub, a rim, a tubular casing mounted on the rim, a series of spring-members engaging the inner face of the casing and arranged to act as cushions between the hub and casing, each of said spring-members including a coiled spring, means including a single manipulative member for simultaneously effecting a variation in tension of all the springs, and means for indicating approximately the degree of tension of the springs.

In testimony whereof, I have signed my name to this specification.

JOHN O. SMITH.